(12) United States Patent
Murray

(10) Patent No.: US 7,228,537 B2
(45) Date of Patent: Jun. 5, 2007

(54) SYSTEM AND METHOD FOR CONFIGURING AN APPLICATION

(75) Inventor: Douglas G. Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 09/947,867

(22) Filed: Sep. 6, 2001

(65) Prior Publication Data
US 2003/0046444 A1 Mar. 6, 2003

(51) Int. Cl.
*G06F 9/44* (2006.01)

(52) U.S. Cl. .................... 717/168; 717/171; 719/320

(58) Field of Classification Search ............... 717/121, 717/168–172, 174–178; 719/327, 328, 310, 719/320; 709/220, 221
See application file for complete search history.

(56) References Cited

U.S. PATENT DOCUMENTS

| | | | | |
|---|---|---|---|---|
| 5,155,847 | A * | 10/1992 | Kirouac et al. ............. | 709/221 |
| 5,473,772 | A * | 12/1995 | Halliwell et al. ........... | 717/171 |
| 5,523,754 | A | 6/1996 | Eisen et al. | |
| 5,546,584 | A | 8/1996 | Lundin et al. | |
| 5,805,897 | A * | 9/1998 | Glowny ...................... | 717/178 |
| 5,923,885 | A * | 7/1999 | Johnson et al. ............. | 717/176 |
| 5,933,637 | A * | 8/1999 | Hurley et al. ................ | 717/107 |
| 5,937,203 | A | 8/1999 | Lee et al. | |
| 5,943,497 | A * | 8/1999 | Bohrer et al. ................ | 717/121 |
| 5,950,011 | A * | 9/1999 | Albrecht et al. ............ | 717/167 |
| 6,128,731 | A | 10/2000 | Zarrin et al. | |
| 6,140,683 | A * | 10/2000 | Duvvury et al. ............ | 257/360 |
| 6,219,698 | B1 * | 4/2001 | Iannucci et al. ............ | 709/221 |
| 6,240,550 | B1 * | 5/2001 | Nathan et al. .............. | 717/169 |
| 6,286,138 | B1 * | 9/2001 | Purcell ....................... | 717/143 |
| 6,332,217 | B1 * | 12/2001 | Hastings ..................... | 717/178 |
| 6,393,495 | B1 * | 5/2002 | Flory et al. ................. | 719/327 |
| 6,430,609 | B1 * | 8/2002 | Dewhurst et al. .......... | 709/220 |
| 6,477,683 | B1 * | 11/2002 | Killian et al. ................ | 716/1 |
| 6,615,255 | B1 * | 9/2003 | Blaszczak ................... | 709/220 |

OTHER PUBLICATIONS

- Chang et al. "Automatic configuration and run-time adaptation of distributed applications" 2000 IEEE, pp. 11-20.*
- Fossa et al. "Interactive configuration management for distributed object systems" 1997 IEEE, pp. 118-128.*
- Homer et al. "Configuring scientific applications in a heterogeneous distributed system" 1994 IEEE, pp. 159-168.*
- Warren et al. "A model for dyanamic configuration which preserves application intergrity" 1996 IEEE, pp. 81-88.*

* cited by examiner

*Primary Examiner*—Van H. Nguyen
(74) *Attorney, Agent, or Firm*—William E. Schiesser; Hoffman, Warnick & D'Alessandro LLC

(57) ABSTRACT

A system and method for configuring an application is provided. Specifically, calls are made from a configuration tool to entry points in a configuration interface, which is implemented as part of the application. In response to the calls, configuration data is modified. Thus, the application is configured from a configuration tool without having to reverse engineer the application's configuration.

17 Claims, 6 Drawing Sheets

SYSTEM AND METHOD FOR CONFIGURING AN APPLICATION

BACKGROUND OF THE INVENTION

1. Technical Field

The present invention generally relates to a system and method for configuring an application. More particularly, the present invention provides a configuration interface for configuring an application in response to calls made to entry points in the interface from a configuration tool.

2. Background Art

In today's business environment, business organizations are increasingly utilizing computer systems in an attempt to become more profitable. Typically, such computer systems are implemented with a combination of hardware and software applications designed to make the business more efficient. Problems arise, however, when the applications must be configured to perform in a certain manner. For example, a business organization might change the address of its electronic mail server. In such a case, the mail server address as configured in the electronic mail application must also be changed. In addition, a business organization might implement a new application. Part of the implementation includes configuring the application to function properly within the organization's computing environment. In the past, configuration was performed on an individual basis. That is, a user would manually access each computer system to configure each application. Such a task, however, is extremely burdensome for a large organization having numerous computer systems.

Heretofore, attempts have been made in developing more efficient methods to configure applications. Under one such attempt, a user can configure an application from a remote workstation. Although this allows the user to configure applications stored on different computer systems from one location, it still has many drawbacks. For example, in order for an application to be configured, the user must be able to access the dialogs used to configure the application. Specifically, each application typically utilizes a unique set of dialogs in setting up its configuration. These dialogs must be identified and accessed before the application can be configured. Generally, the dialogs are identified and accessed by reverse engineering the application's configuration. However, reverse engineering has many potential problems such as constantly having to keep up with configuration chances in the application, and not being able to access configuration data stored in a proprietary manner.

In view of the foregoing, there exists a need for a system and method for configuring an application. A need also exists for a system and method to be able to configure an application from a central workstation via a configuration interface in the application so that reverse engineering of the application's configuration is not necessary.

SUMMARY OF THE INVENTION

The present invention overcomes the drawbacks of existing systems by providing a system and method for configuring an application. Specifically, the present invention provides an application interface, in the application to be configured, that has generic entry points and specific entry points. Calls made from a configuration tool to the entry points cause corresponding changes to be made to the application's configuration.

According to a first aspect of the present invention, a system for configuring an application is provided. The system comprises: (1) a configuration interface having entry points; (2) an access system for accessing configuration data in the application; and (3) a modification system for modifying the accessed configuration data in response to calls made to the entry points.

According to a second aspect of the present invention, a system for configuring an application is provided. The system comprises: (1) a configuration interface having generic entry points and specific entry points; (2) a retrieval system for retrieving configuration data from the application to the configuration interface; (3) a modification system for modifying the retrieved configuration data in response to calls made to the generic entry points and the specific entry points; and (4) a sending system for sending the modified configuration data to the application.

According to a third aspect of the present invention, a system for configuring an application is provided. The system comprises: (1) a configuration interface having generic entry points and specific entry points; (2) a retrieval system for retrieving configuration data from the application to a configuration tool; (3) a modification system for modifying the retrieved configuration data in response to calls made to the generic entry points and the specific entry points; and (4) a sending system for sending the modified configuration data to the application.

According to a fourth aspect of the present invention, a system for configuring an application is provided. The system comprises: (1) an application having a configuration interface, wherein the configuration interface has entry points; (2) a configuration tool for making calls to the entry points; (3) a retrieval system for retrieving configuration data from the application; (4) a modification system for modifying the retrieved configuration data in response to calls made to the entry points; and (5) a sending system for sending the modified configuration data to the application.

According to a fifth aspect of the present invention, a method for configuring an application is provided. The method comprises: (1) providing a configuration interface having entry points; (2) accessing configuration data in the application; and (3) modifying the accessed configuration data in response to calls made to the entry points.

According to a sixth aspect of the present invention, a method for configuring an application is provided. The method comprises: (1) providing a configuration interface having generic entry points and specific entry points; (2) retrieving configuration data from the application to the configuration interface; (3) modifying the retrieved configuration data in response to calls made to the generic entry points and the specific entry points; and (4) sending the modified configuration data to the application.

According to a seventh aspect of the present invention, a method for configuring an application is provided. The method comprises: (1) providing a configuration interface having generic entry points and specific entry points; (2) retrieving configuration data from the application to a configuration tool; (3) modifying the retrieved configuration data in response to calls made to the generic entry points and the specific entry points; and (4) sending the modified configuration data to the application.

According to an eighth aspect of the present invention, a method for configuring an application is provided. The method comprises: (1) providing an application having a configuration interface, wherein the configuration interface has entry points; (2) making calls to the entry points from a configuration tool; (3) retrieving configuration data from the application; (4) modifying the retrieved configuration data in response to the calls made to the entry points; and (5) sending the modified configuration data to the application.

According to a ninth aspect of the present invention, a program product stored on a recordable medium for configuring an application is provided. When executed, the program product comprises: (1) a configuration interface having generic entry points and specific entry points; (2) program code configured to retrieve configuration data from the application; (3) program code configured to modify the retrieved configuration data in response to calls made to the generic entry points and the specific entry points; and (4) program code configured to send the modified configuration data to the application.

Therefore, the present invention provides a system and method for configuring an application.

BRIEF DESCRIPTION OF THE DRAWINGS

These and other features and advantages of this invention will be more readily understood from the following detailed description of the various aspects of the invention taken in conjunction with the accompanying drawings in which.

Figure 1:
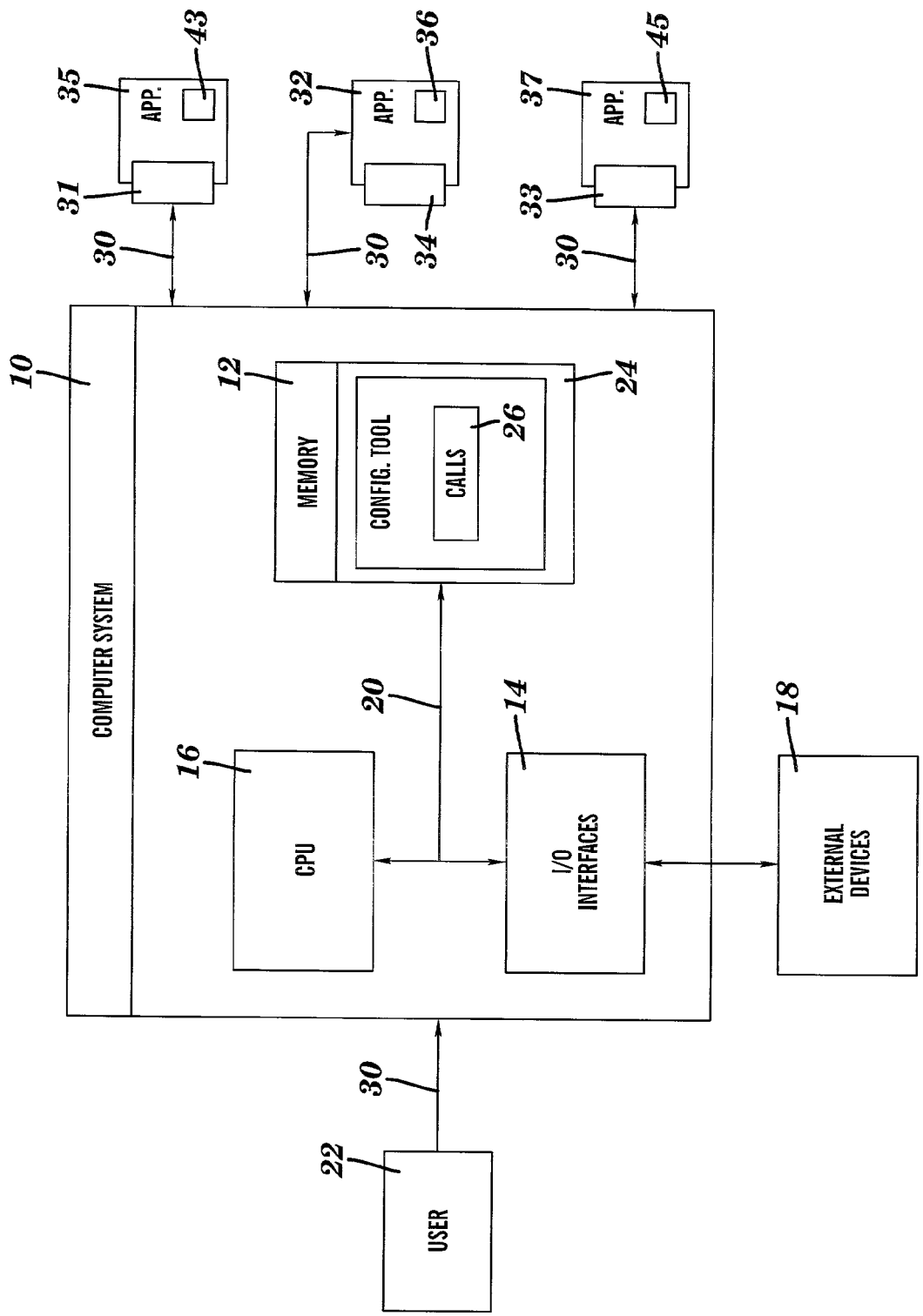
FIG. 1 depicts a computer system having a configuration tool according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

For convenience, the description will have the following sections:
I. Definitions
II. Computer System
III. Configuration System I. Definitions Configuration Tool—a program or the like from which an application is configured.

Configuration Interface—an interface within an application that is to be configured through which a configuration tool communicates.

Generic Entry Point—a point of access within a configuration interface that is common to all applications.

Specific Entry Point—a point of access within a configuration interface that is specific to a particular application.

Call—a request to change an application's configuration made from a configuration tool to an entry point.

II. Computer System

In general, the present invention provides a system and method for configuring an application from a configuration tool. Under the present invention, each application is implemented with an application-specific configuration interface. The configuration interface includes generic entry points and specific entry points. Based upon calls made to the entry points from the configuration tool, configuration data in the application is accessed and modified (or retrieved, modified, and sent as will be described in further detail below). In utilizing a configuration interface, the same code is used to configure the application that the application itself would have utilized. This eliminates the need to reverse engineer the application's configuration.

Referring now to FIG. 1, a computer system 10 that includes configuration tool 24 of the present invention is shown. Computer system 10 generally comprises memory 12, input/output interfaces 14, a central processing unit (CPU) 16, external devices/resources 18, and bus 20. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including a CRT, LED screen, hand-held device, keyboard, mouse, voice recognition system, speech output system, printer, facsimile, pager, personal digital assistant, cellular phone, web phone, etc. Bus 20 provides a communication link between each of the components in the computer system 10 and likewise may comprise any known type of transmission link, including electrical, optical, wireless, etc. In addition, although not shown, additional components, such as cache memory, communication systems, system software, etc., may be incorporated into computer system 10.

Stored in memory 12 is configuration tool 24 (shown in FIG. 1 as a software product). Configuration tool 24 is preferably a configuration program that is utilized by user 22 to modify an application's 32, 35, or 37 configuration (i.e., configuration data 36, 43, and 45). As such, configuration tool 24 can be a program whose sole purpose is to configure applications 32, 35, and 37. Alternatively, configuration tool 24 can be the same program as one or more of the applications 32, 35, or 37 being configured. As indicated above, to modify an application's 32 configuration, user 22 will make calls 26 to entry points within application's 32 configuration interface 34. In response to the calls, configuration interface 34 will access and modify configuration data 36 in application 32.

Communication with computer system 10 and configuration interfaces 31, 33, and 34 and occurs via communication links 30. Communications links 30 can include a direct terminal connected to the computer system 10, or a remote workstation in a client-server environment. In the case of the latter, the client and server may be connected via the Internet, wide area networks (WAN), local area networks (LAN) or other private networks. The server and client may utilize conventional token ring connectivity, Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system.

It is understood that the present invention can be realized in hardware, software, or a combination of hardware and software. Moreover, computer system 10 according to the present invention can be realized in a centralized fashion in a single computerized workstation, or in a distributed fashion where different elements are spread across several interconnected systems (e.g., a network). Any kind of computer/server system(s)—or other apparatus adapted for carrying out the methods described herein—is suited. A typical combination of hardware and software could be a general purpose computer system with a computer program that, when loaded and executed, controls computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

III. Configuration System

Figure 2:
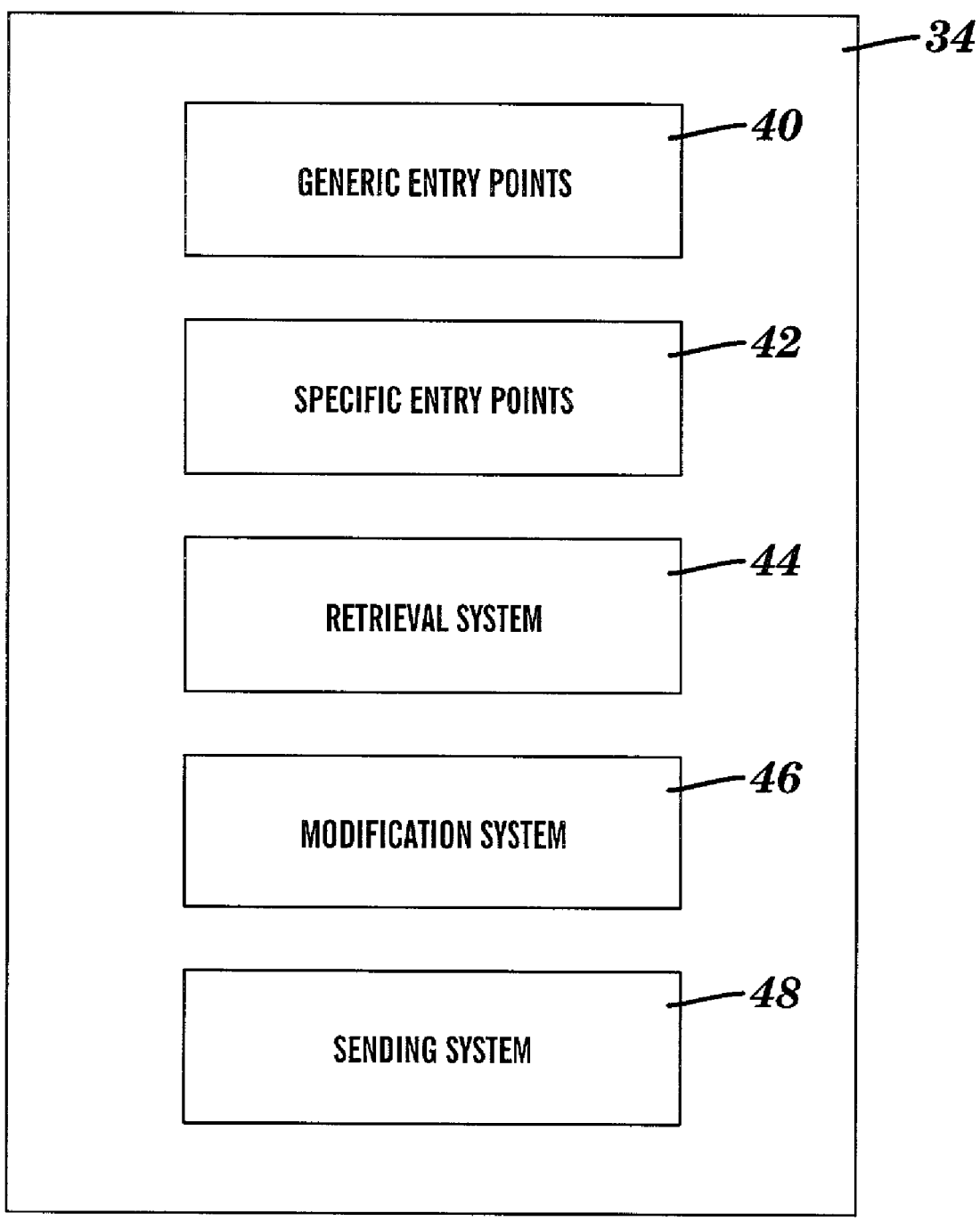
FIG. 2 depicts a box diagram of a first exemplary configuration interface.

Referring now to FIG. 2, a more detailed depiction of a first exemplary configuration interface 34 is provided. In general, each application is created/implemented with a configuration interface such as that shown. Users can communicate with configuration interface 34, via configuration tool, to configure the corresponding application. Preferably, configuration interface 34 configures the application in the same manner in which the application would configure itself. For example, in configuring the application, the user would view the same set of dialogs (windows) that he/she would view if configuring the application manually/directly (i.e., not through a configuration tool). In previous configuration systems, the same dialogs were not available. Hence, the user had to first reverse engineer the application's configuration. In a preferred embodiment, configuration interface 34 is implemented in as an Active-X interface. In an alternative embodiment, configuration interface 34 is implemented as a DLL interface. In either embodiment, application interface 34 is preferably implemented as a component of the application.

As shown, configuration interface 34 includes generic entry points 40, specific entry points 42, retrieval system 44, modification system 46, and sending system 48. As explained above, entry points provide access to configuration data from the configuration tool. Generic entry points 40 are common to most or all applications, that is, require no knowledge of the application. Examples of generic entry points 40 include importing or exporting functions. Specific entry points 42 are specific to a particular application and require some knowledge of the application. For example, if the application is Lotus Notes, one specific entry point 42 could be to create a connection document (a function unique to Lotus Notes).

In response to calls from the configuration tool, retrieval system 44 will retrieve any necessary configuration data from an application. In general, configuration data is arranged into one or more array of settings. A user will make a call to an entry point to effect a particular change in the application's configuration data. Retrieval system 44 will interpret the call and retrieve a particular set of configuration data to either configuration interface 34 or the configuration tool (as will be further described below). Once retrieved, modification system 46 will modify the retrieved data in response to the call. For example, a user could place a call to "change mail server address to xxx.yyy." In this case, retrieval system 44 will retrieve the appropriate configuration data from application and modification system 46 will make the requested change. Once changed, the modified configuration data is then sent back to the application via sending system 48.

Although this description includes calls being made to both generic entry points 40 and specific entry points 42, it should be appreciated that any quantity of calls could be made to either entry point. For example, a user could configure an application by making one call to a generic entry point 40 and none to a specific entry point 42. Examples of calls that can be made include the following:

A. Calls to Generic Entry Points

SetLogName—to set the name of the log file used to produce a status or log of events.

GetAppInfo—to get application information that can then be used in a main dialog or to make decisions in the calling program.

LoadData—to load the application configuration data into memory.

SaveData—to configure the application from the data that is currently in memory.

DataModified—to determine whether the application configuration that is stored in memory has been modified since it was loaded.

RebootRequired—to determine whether the system must be rebooted in order for any changes that might have been made to this application's configuration to take effect.

ImportData—to import configuration data from an import file.

ExportData—to export configuration data to an import file.

MigrateTo—to migrate any files associated with the configuration of the application.

MigrateFrom—to use migrate files associated with the configuration of the application.

Query—to collect a sub set of the configuration data and place it in a log file.

Installed—to determine if the application is installed.

OpenDialog—to display a dialog for the application configuration.

CheckDialog—to check the current configuration data and display an error message.

CloseDialog—to close a dialog that was opened by calling the OpenDialog call.

DisplayHelp—to display the help screens for this application.

B. Calls to Specific Entry Points

PutSetting—to replace configuration data in memory.

GetSetting—to retrieve configuration data from memory.

CheckData—to check the configuration data in memory.

AddSetting—to add a new setting to an array.

DeleteSetting—to delete a setting from an array in the application configuration.

Figure 3:
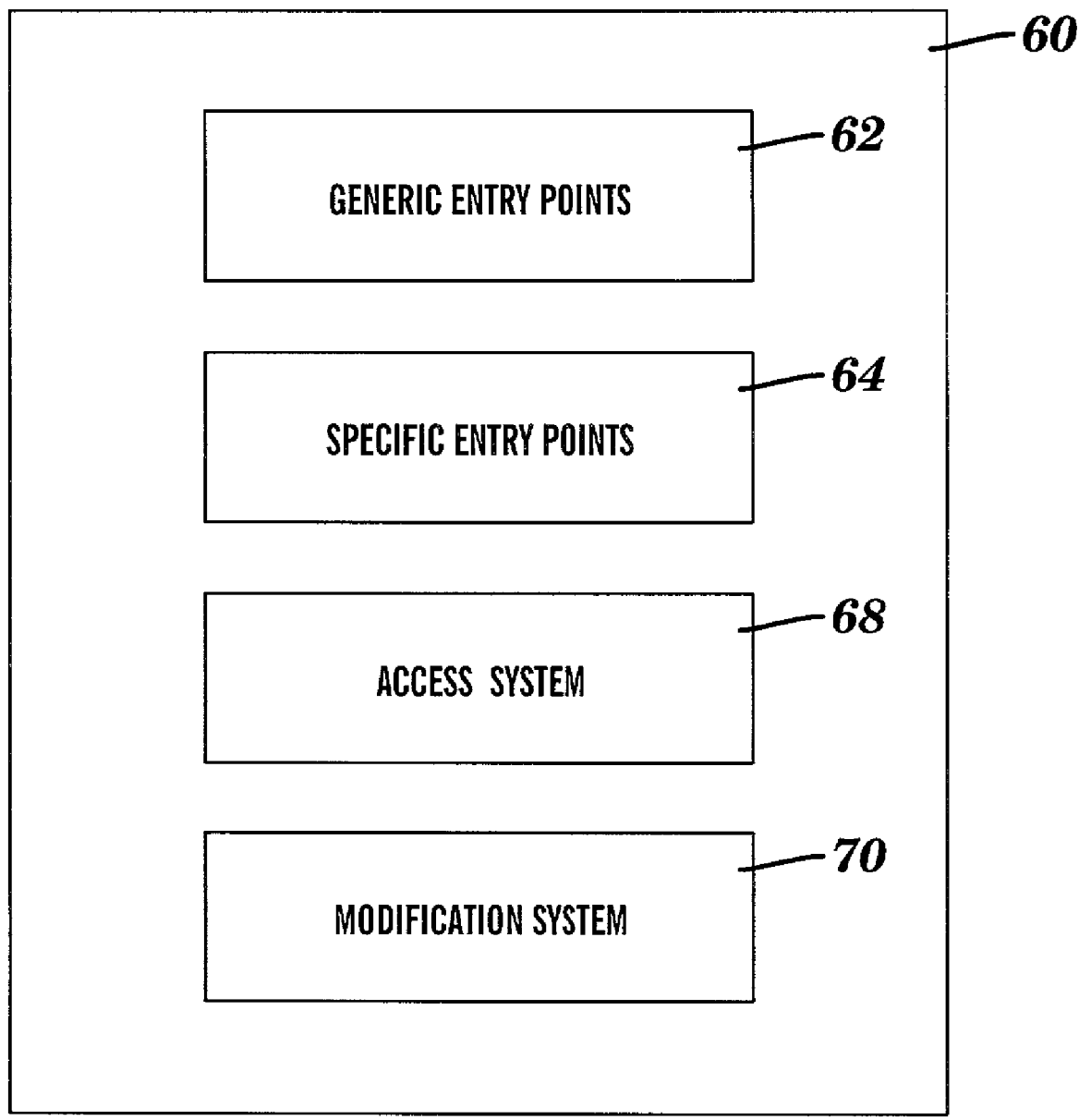
FIG. 3 depicts a box diagram of a second exemplary configuration interface.

Referring now to FIG. 3, a second exemplary configuration interface 60 is depicted. As shown, configuration interface 60 includes generic entry points 62 and specific entry points 64. These entry points 62 and 64 can be the same as illustrated above. However, in lieu of a retrieval system and a sending system, configuration interface 60 includes access system 68. This is so that the configuration data need not be retrieved from an application, modified, and then sent back. In contrast, configuration interface 60 could access the pertinent configuration data at its current location and then modify the accessed data via modification system 70 (i.e., in response to the calls).

Figure 4:
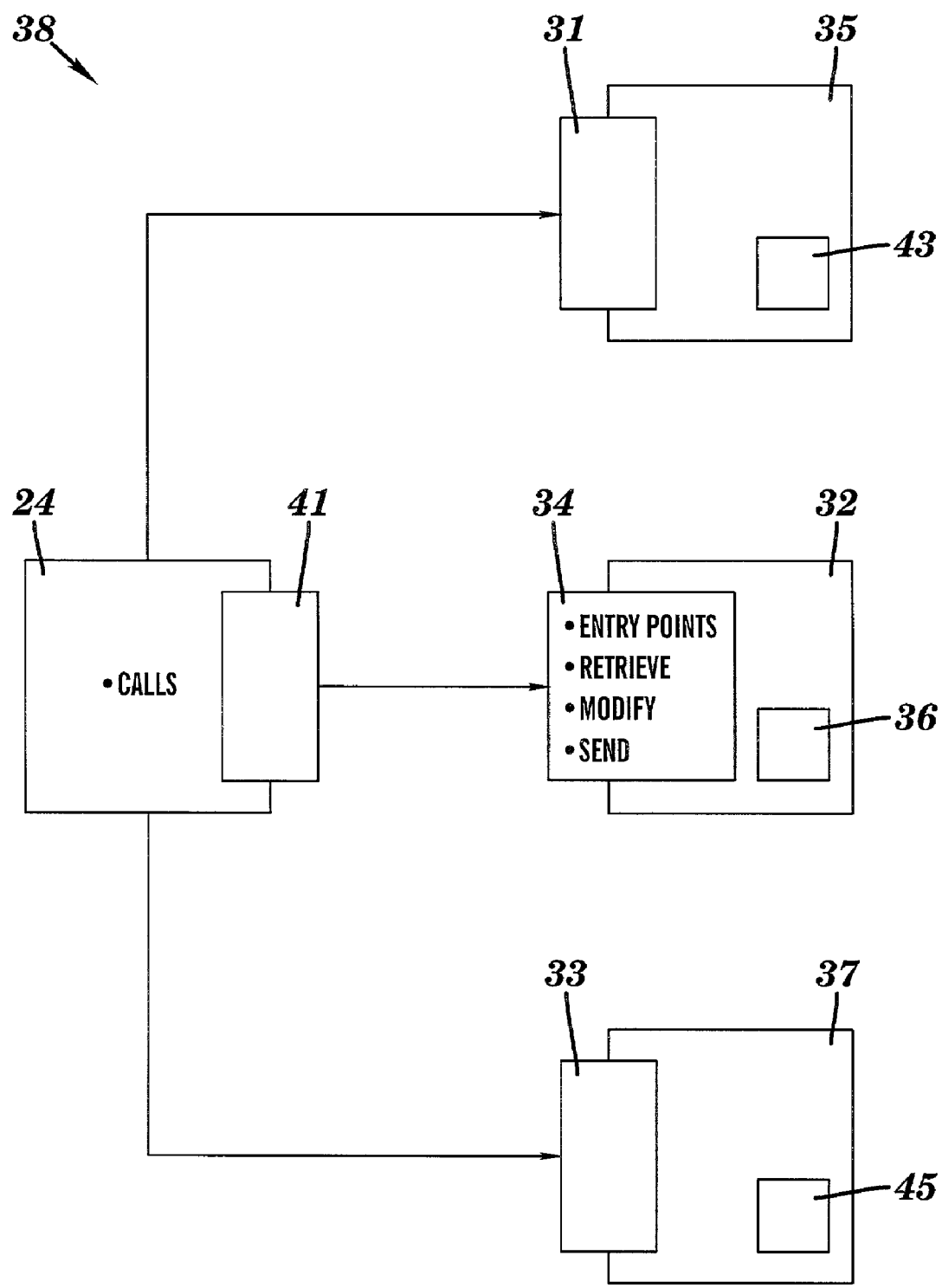
FIG. 4 depicts a box diagram of an application being configured according to a first embodiment of the present invention.

Referring now to FIG. 4, a system 38 for configuring an application 32 according to a first embodiment of the present invention is shown. As depicted, a call can be placed from configuration tool 24 to application 32. In this first embodiment, the call will be made to an entry point within configuration interface 34. Configuration interface 34 will then locate and retrieve configuration data 36 from application 32 (i.e., from a file) based upon the call. Then, configuration interface 34 will modify the configuration data 36 to effect the change requested in the call (i.e., in response to the call). Once modified, the configuration data is sent back to the appropriate file in the application 32. In this embodiment, retrieval, modification, and sending are all performed by configuration interface 34 at application 32. Thus, communication between configuration tool 24 and applications 32, 35, and 37 is depicted as uni-directional. That is, communication occurs from configuration tool 24 to configuration interface 34.

In an alternative scenario, configuration interface 34 could simply access configuration data 36 and modify the same without receiving and sending. Under this scenario, the configuration interface would be configuration interface 60 shown in FIG. 3. Specifically, access system 62 would access the configuration data 36 at its present location in application 32 and then modification system 64 would modify the pertinent accessed data. In either scenario, each application 32, 35, and 37 being implemented with a configuration interface 31, 33, and 34 (or 60) allows a user to configure applications 32, 35, and 37 (as shown) using configuration tool 24.

Configuration tool 24 itself can also be implemented with or without a configuration interface 41. This demonstrates that configuration tool 24 need not be an application whose sole purpose is to configure other applications. In contrast, configuration tool 24 can be the same program (e.g., Lotus Notes) as an application 32, 35, and/or 37. This allows a user to use configuration tool 24 to effect the same or similar changes in other like applications 32, 35 and/or 37.

Figure 5:
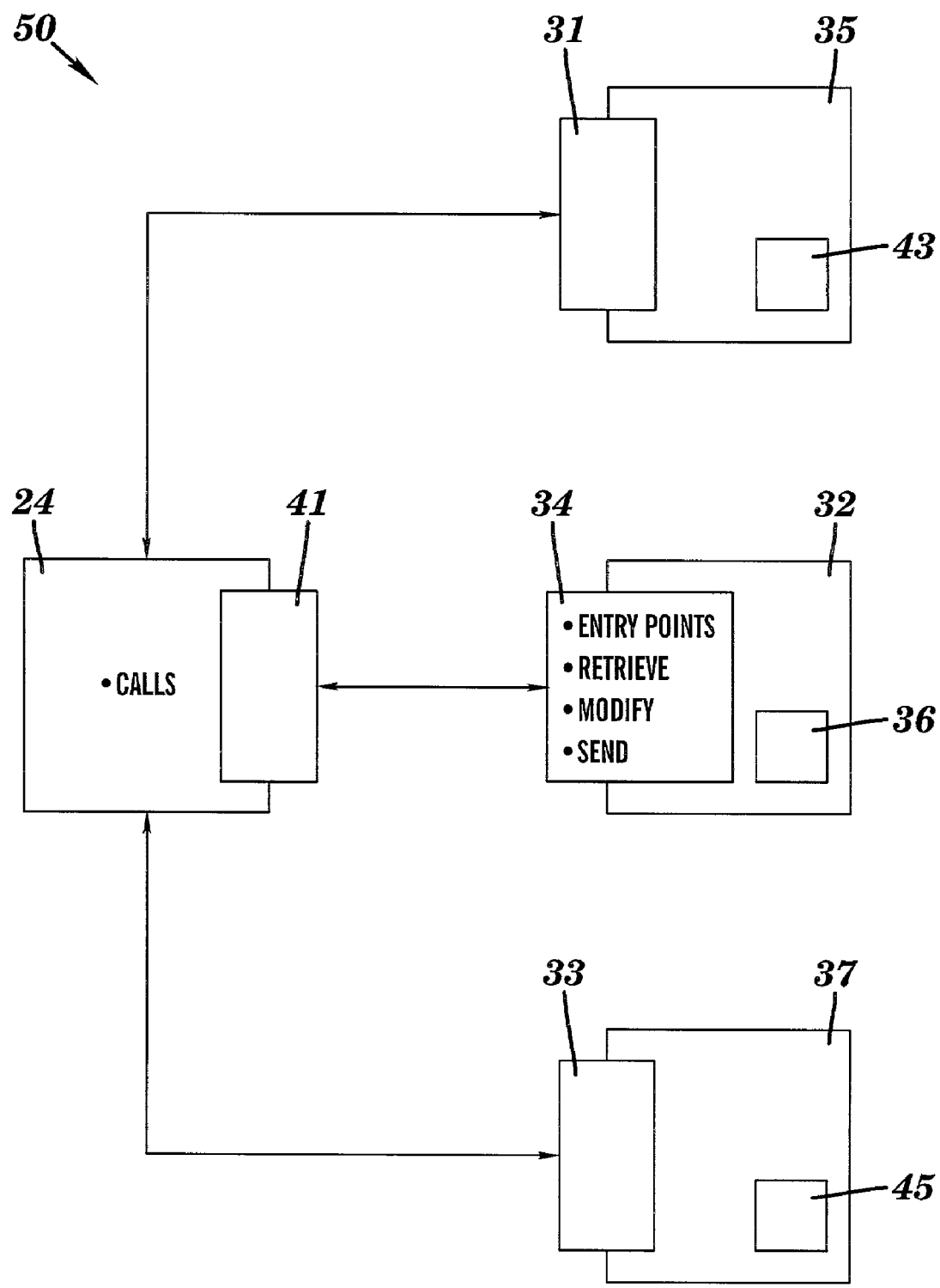
FIG. 5 depicts a box diagram of an application being configured according to a second embodiment of the present invention.

Referring now to FIG. 5, a system 50 for configuring an application 32 according to a second embodiment of the present invention is shown. In this embodiment, communication with applications 32, 35, and 37 is bi-directional. Specifically, calls can be made to entry points of configuration interface 34 from configuration tool 24. Retrieval system (shown in FIG. 2) of configuration interface 34 will then identify the pertinent configuration data 36 and retrieve the same to configuration tool 24 (as opposed to configuration interface 34). Modification system will then modify the retrieved configuration data at configuration tool 24. The modified configuration data will then be retrieved from configuration tool 24 and sent back to the appropriate file by the sending system of configuration interface 34. Under this embodiment, configuration interface 34 performs the same functions as described above. However, the modification is occurring at the configuration tool 24 instead of at configuration interface 34 of application 32. This allows configuration tool 24 to implement the modified configuration data, in other application 35 and 37. Specifically, in addition to sending the modified configuration data back to the application 32 from which it was received, configuration tool 24 could also copy the configuration data to other applications 35 and 37.

Similar to the embodiment shown in FIG. 4, configuration tool 24 can be implemented with or without a configuration interface 41. As explained, this demonstrates that configuration tool 24 need not be an application whose sole purpose is to configure other applications. In contrast, configuration tool 24 can be the same program (e.g., Lotus Notes) as application 32. This allows a user to configure configuration tool 24 and then effect the same or similar changes throughout other like applications 35 and 37. Similarly, a user could configure applications 35 and 37 based upon a single application's 32 configuration. For example, since communication is bi-directional, configuration tool 24 could import configuration data from one application 32 and export it to another application 35, thereby causing both applications 32 and 35 to have a similar configuration.

Figure 6:
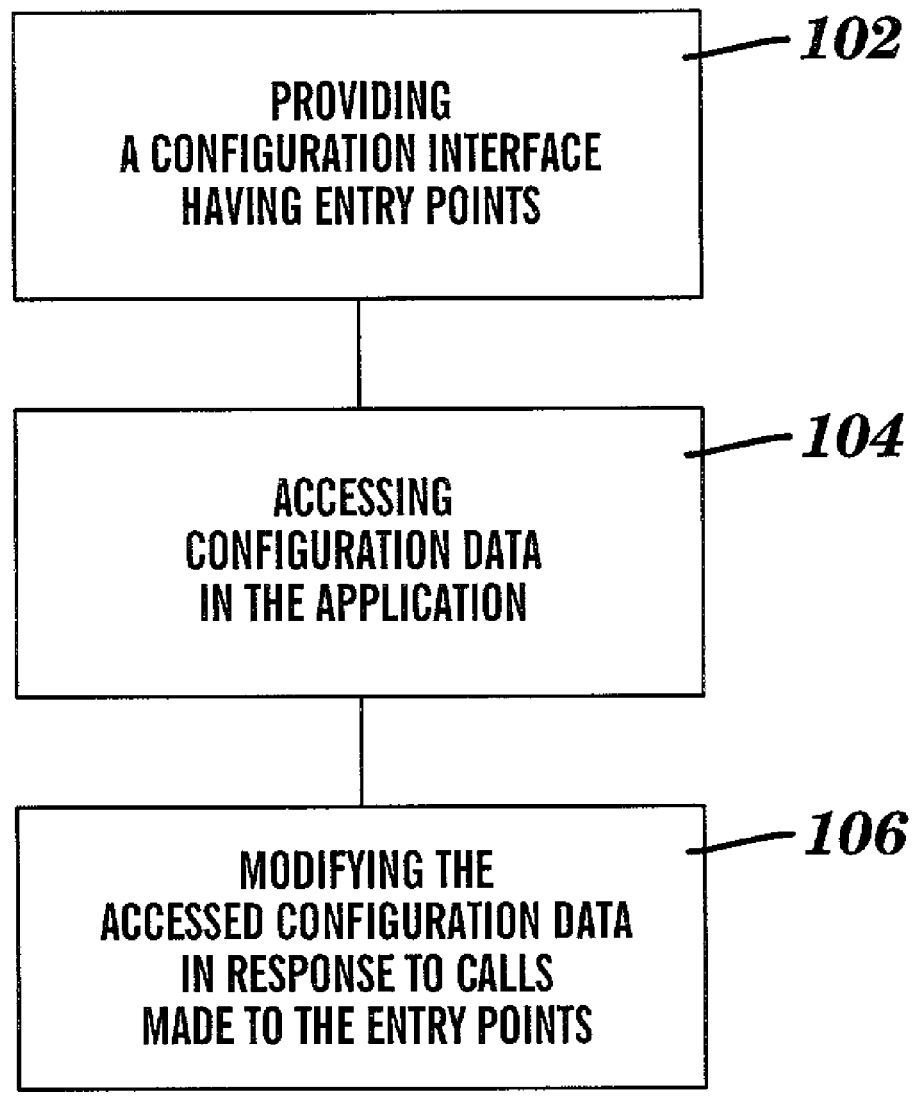
FIG. 6 depicts a method flow chart according to the present invention.

Referring now to FIG. 6, a method 100 according to the present invention is shown. First step 102 in method is to provide a configuration interface having entry points. Second step 104 is to access configuration data in the application. Third step 106 is to modify the accessed configuration data in response to calls made to the entry points.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A computer system for remotely configuring an application, comprising:
   a central processing unit;
   a memory;
   a configuration tool stored in the memory;
   an application-specific configuration interface within the application having entry points to the application for accessing the application, the entry points being adapted to receive a call from the configuration tool to change a configuration of the application;
   an access system for accessing configuration data at its current location in the application; and
   a modification system for modifying the accessed configuration data of the application at its current location in the application in response to the call made to the entry points from the configuration tool,
   wherein the entry points comprise a generic entry point that is common to all applications and a specific entry point that is specific to the application, and
   wherein the application is remotely configured in a same manner in which the application would configure itself using identical dialogs to those that would be used to locally configure the application.

2. The system of claim 1, wherein the configuration tool is a configuration program.

3. The system of claim 1, wherein a pertinent set of configuration data accessed in response to the call.

4. A computer system for remotely configuring an application, comprising:

a central processing unit;

a memory;

a configuration tool stored in the memory;

an application-specific configuration interface within the application having generic entry points that are common to all applications and specific entry points that are specific to the application for accessing the application;

a retrieval system for retrieving configuration data from the application to the configuration interface;

a modification system for modifying the retrieved configuration data of the application in response to calls made from the configuration tool to the generic entry points and the specific entry points; and a sending system for sending the modified configuration data from the configuration interface to the application, wherein the application is remotely configured in a same manner in which the application would configure itself using identical dialogs to those that would be used to locally configure the application.

5. The system of claim 4, wherein the configuration tool is a configuration program.

6. A computer system for remotely configuring an application, comprising:

a central processing unit;

a memory;

a configuration tool stored in the memory;

an application-specific configuration interface within the application having generic entry points that are common to all applications and specific entry points that are specific to the application for accessing the application, the entry points being adapted to receive a call from the configuration tool to change a configuration of the application;

a retrieval system for retrieving configuration data from the application to the configuration tool;

a modification system for modifying the retrieved configuration data of the application in response to the call made to the generic entry points and the specific entry points; and a sending system for sending the modified configuration data from the configuration tool to the application, wherein the application is remotely configured in a same manner in which the application would configure itself using identical dialogs to those that would be used to locally configure the application.

7. A computer system for remotely configuring an application, comprising:

a central processing unit;

a memory;

an application having an application-specific configuration interface within the application, wherein the configuration interface has entry points for accessing the application, the entry points being adapted to receive a call to change a configuration of the application;

a configuration tool stored in the memory for making calls to the entry points;

a retrieval system for retrieving configuration data from the application to the configuration tool;

a modification system for modifying the retrieved configuration data of the application in response to calls made to the entry points; and a sending system for sending the modified configuration data from the configuration tool to the application, wherein the entry points comprise a generic entry point that is common to all applications and a specific entry point that is specific to the application, and wherein the application is remotely configured in a same manner in which the application would configure itself using identical dialogs to those that would be used to locally configure the application.

8. The system of claim 7, wherein the configuration data is retrieved from the application to the configuration interface, and wherein the modified configuration data is sent from the configuration interface to the application.

9. A computer implemented method for remotely configuring an application, comprising the steps of:

providing an application-specific configuration interface within the application having entry points to the application for accessing the application, the entry points being adapted to receive a call to change a configuration of the application;

making calls to the entry points from a configuration tool;

accessing configuration data at its current location in the application; and modifying the accessed configuration data at its current location in the application in response to the calls made from the configuration tool to the entry points, wherein the entry points comprise generic entry points that are common to all applications and specific entry points that are specific to the application; and wherein the application is remotely configured in a same manner in which the application would configure itself using identical dialogs to those that would be used to locally configure the application.

10. The method of claim 9, wherein the accessing step comprises the step of accessing a pertinent set of configuration data based upon the calls made to the entry points from the configuration tool.

11. A computer implemented method for configuring an application, comprising the steps of:

providing an application-specific configuration interface within the application having generic entry points that are common to all applications and specific entry points that are specific to the application for accessing the application, the entry points being adapted to receive a call to change a configuration of the application;

making calls to the generic entry points and the specific entry points from a configuration tool;

retrieving configuration data from the application to the configuration interface;

modifying the retrieved configuration data of the application in response to the calls made from the configuration tool to the generic entry points and the specific entry points; and sending the modified configuration data from the configuration interface to the application, wherein the application is remotely configured in a same manner in which the application would configure itself using identical dialogs to those that would be used to locally configure the application.

12. A computer implemented method for remotely configuring an application, comprising the steps of:

providing an application-specific configuration interface within the application having generic entry points that are common to all applications and specific entry points that are specific to the application for accessing the application, the entry points being adapted to receive a call to change a configuration of the application;

making calls to the generic entry points and the specific entry points from a configuration tool;

retrieving configuration data from the application to the configuration tool;

modifying the retrieved configuration of the application data in response to the calls made from the configuration tool to the generic entry points and the specific entry points; and sending the modified configuration data from the configuration tool to the application, wherein the application is remotely configured in a same manner in which the application would configure itself using identical dialogs to those that would be used to locally configure the application.

13. A computer implemented method for remotely configuring an application, comprising the steps of:

providing an application having an application-specific configuration interface within the application, wherein the configuration interface has generic entry points and specific entry points to the application for accessing the application, the entry points being adapted to receive a call to change a configuration of the application;

making calls to the generic entry points and the specific entry points from a configuration tool;

retrieving configuration data from the application to the configuration tool;

modifying the retrieved configuration data of the application in response to the calls made to the entry points; and sending the modified configuration data from the configuration tool to the application, wherein the generic entry points are common to all applications and the specific entry points are specific to the application; and wherein the application is remotely configured in a same manner in which the application would configure itself using identical dialogs to those that would be used to locally configure the application.

14. The method of claim 13, wherein the retrieving step comprises the step of retrieving configuration data from the application to the configuration interface.

15. A computer executable program product stored on a computer readable storage medium for remotely configuring an application, which when executed, comprises:

program code configured to provide an application-specific configuration interface within the application having generic entry points that are common to all applications and specific entry points that are specific to the application for accessing the application, the entry points being adapted to receive a call to change a configuration of the application;

program code configured to make calls to the generic entry points and the specific entry points from a configuration tool;

program code configured to retrieve configuration data from the application to the configuration tool;

program code configured to modify the retrieved configuration data of the application in response to the calls made from the configuration tool to the generic entry points and the specific entry points; and program code configured to send the modified configuration data from the configuration tool to the application, wherein the application is remotely configured in a same manner in which the application would configure itself using identical dialogs to those that would be used to locally configure the application.

16. The program product of claim 15, wherein the configuration tool is a configuration program.

17. The program product of claim 15, wherein the configuration data is retrieved from the application to the configuration interface.

* * * * *